(12) United States Patent
Meier et al.

(10) Patent No.: US 7,551,757 B2
(45) Date of Patent: Jun. 23, 2009

(54) METHOD FOR DETERMINING THE BEARING SURFACE IN SKIN PRINT IMAGES

(75) Inventors: Reinhard Meier, Buxtehude (DE); Steffen Scholze, Hamburg (DE)

(73) Assignee: NXP B.V., Eindhoven (NL)

( * ) Notice: Subject to any disclaimer, the term of this patent is extended or adjusted under 35 U.S.C. 154(b) by 372 days.

(21) Appl. No.: 10/541,910

(22) PCT Filed: Dec. 22, 2003

(86) PCT No.: PCT/IB03/06278

§ 371 (c)(1),
(2), (4) Date: Jul. 8, 2005

(87) PCT Pub. No.: WO2004/063976

PCT Pub. Date: Jul. 29, 2004

(65) Prior Publication Data

US 2006/0072794 A1    Apr. 6, 2006

(30) Foreign Application Priority Data

Jan. 9, 2003    (EP) .................................. 03100026

(51) Int. Cl.
*G06K 9/00* (2006.01)
(52) U.S. Cl. ........................ 382/124; 382/115; 382/125; 382/190

(58) Field of Classification Search .................. 382/100, 382/119, 124, 118, 125
See application file for complete search history.

(56) References Cited

U.S. PATENT DOCUMENTS

| | | | | |
|---|---|---|---|---|
| 5,926,555 | A * | 7/1999 | Ort et al. ..................... | 382/124 |
| 7,142,699 | B2 * | 11/2006 | Reisman et al. ............. | 382/124 |
| 2006/0083410 | A1 * | 4/2006 | Meier ......................... | 382/124 |

OTHER PUBLICATIONS

B.M.Mehtre et al: "Segmentation of Fingerprint Images Using the Directional Image" Pattern Recognition, vol. 20, No. 4, pp. 429-435, Pergamon Journal Ltd., 1987.

* cited by examiner

*Primary Examiner*—Matthew C Bella
*Assistant Examiner*—Eric Rush

(57) ABSTRACT

In a method for determining the bearing surface in images of skin prints, the skin having ridges and furrows and the images existing in the form of image data, the image is filtered with a plurality of Gabor filters whose cosine functions are oriented in different directions in the spatial domain. From the filter responses, surfaces are determined that are each distinguished by an approximate direction of the ridges/furrows, which direction is preset by the respective Gabor filter. The surfaces are combined to an overall surface that represents the bearing surface.

10 Claims, 2 Drawing Sheets

| a | b | c | d |

| a | b | c | d |

METHOD FOR DETERMINING THE BEARING SURFACE IN SKIN PRINT IMAGES

The invention relates to a method for determining the bearing surface in images of skin prints, the skin having ridges and furrows and the images existing in the form of image data.

To enable images of skin prints, and particularly fingerprints, to be acquired automatically, the skin area to be imaged, particularly the fingertip, is scanned by a sensor. The skin area is laid on a surface that, in the case of an optical scanning, is transparent. However, the sensing region of the sensor is generally rectangular and the bearing surface usually does not take up the whole of the area sensed by the sensor. This produces parts of the image that may interfere with the subsequent analysis.

A method based on the pattern of directions is known from B. M. Mehtre et al., "Segmentation of Fingerprint Images Using the Directional Image", Pattern Recognition, Vol. 20, No. 4, pp. 429-435, Pergamon Journal Ltd., 1987. A method in which the bearing surface is determined from the levels of the variances calculated orthogonally to the path of the furrows is known from N. K. Ratha, S. Chen, A. Jain, "Adaptive Flow Orientation-Based Feature Extraction in Fingerprint Images", Pattern Recognition, Vol. 28, No. 11, pp. 1657-1672, November 1995.

It is an object of the present invention to reliably determine the bearing surface, so that the subsequent image-processing steps can be confined to the information contained in the bearing surface. This is to be done with the least possible computing work.

This object is achieved in accordance with the invention in that the image is filtered with a plurality of Gabor filters with different directions of the cosine function in the special domain, in that areas are determined from the filter responses, which areas are each distinguished by an approximate direction, preset by the particular Gabor filter, of the ridges/furrows, and in that the areas are combined to an overall area that represents the bearing surface.

The method according to the invention makes it possible for the bearing surface—also termed foreground or region of interest—to be determined, so as to enable the remaining region sensed by a sensor (background) to be excluded from further processing. The method according to the invention has the advantage of recognizing the bearing surface with great reliability even when the quality of the image is poor due to dry, excessively damp or excessively greasy fingers or due to dirtying, or when there is only a small difference in mean brightness between the foreground and background or when there are structures in the background that are to some degree typical of the fingerprint itself, such as shadows cast by optical sensors or stripes parallel to an axis (horizontal or vertical) generated by the electronics of the sensor.

The high reliability with which the bearing surface is recognized allows the quality of the image as a whole (the global image quality) to be determined in a meaningful way by comparing the size of the bearing surface with the size of the sensor area. The method according to the invention also makes it possible to determine whether there is actually a finger on the sensor.

It has proved advantageous for four Gabor filters to be used. These filters are preferably so oriented that the directions of the Gabor filters are determined by angles of 22.5°, 67.5°, 112.5° and 157.5° to an edge of the filter. These directions are each centrally positioned between a principal axis and a diagonal. This makes it possible for the size of the filter response that produces the above-mentioned equipment-generated stripes parallel to an axis to be kept as small as possible.

The wavelength of the Gabor filters can be preset to a fixed value and should be of the same order of magnitude as the wavelength of the fingerprint furrows. When the wavelength is given in pixels, it is of course dependent on the sensor used. At a sensor resolution of 500 dpi, a figure of nine pixels for the wavelength has proved advantageous. The standard deviation of the Gaussian bell curve of the Gabor filters should be somewhat less than half the wavelength. The filter mask should cover at least two adjacent furrows. A size of 21×21 pixels has been found to be advantageous.

Gabor filters are particularly well suited to the recognition of fingerprint furrows, because they rely on generating a large filter response to two features of the image examined which, as a rule, are in fact only found in relevant regions of images of fingerprints: a periodic furrow-like structure and a typical density of furrows. Elements of the image in which one of these two elements shows deviations from values typical of fingerprints are, to a very large extent, "ignored" by the Gabor filters, i.e. the sizes of the relevant filter responses are small.

To obtain from the filter responses regions of the fingerprint that have a certain direction in common, provision is made in a further embodiment of the method according to the invention, to allow the areas to be determined from the filter responses, for a variance to be derived each time from the given filter response tile by tile of the tiles into which the image is divided, and for tiles having a variance that is greater than a preset threshold value to be assigned to the given area.

In an advantageous form of this further embodiment, the derivation of the variance is performed by deriving the variances for tiles that overlap one another. Provision is preferably made in this case for, at a resolution of approximately 500 dpi, the size of the tiles used for deriving the variance to be 16×16 pixels, which tiles are each processed in steps of eight pixels.

The areas containing different ridge directions that are formed in this way often contain small isolated areas, small peaks and small indentations and, in another embodiment, these are smoothed out by adapting the pixels to the environment, as predominant at the time, of the given pixel by means of smoothing filters.

Even somewhat larger isolated areas may produce errors so, in another embodiment, these are eliminated by further processing by determining the surface area of the areas determined up till then and suppressing areas whose surface area is of less than a preset size. For this purpose, provision is preferably made for the surface area to be determined by tracing the outlines of the areas using an edge-tracing algorithm.

If a fingertip is pressed against a flat surface, it can, per se, be assumed that the shape of the bearing surface will be free of holes or large indentations. A shape of this kind is characterized by the fact that each horizontal straight line and each vertical straight line intersects the bearing surface only once.

To obtain such a bearing surface there is provided in a further embodiment of the method according to the invention that the bearing surface determined up to that point is examined for indentations and that tiles situated in indentations are assumed to belong to the bearing surface. This method may advantageously be performed in particular by, on both sides of the bearing surface determined up to that point, setting each one of pointers that start from the two ends of the side to the outermost of the tiles determined as belonging to the bearing surface, the pointers then moving towards one another and, from line to line, assuming the position of a tile that is situated farther outwards or, if there is an indentation, remaining in the same position, and by having the travel of the pointers, until they meet form the given edge of the definitive bearing surface.

The interim result prior to this application of anisotropic convexity identifies precisely the regions in which the local quality of the image is high. Use can be made of this fact to allow features that are subsequently found in the regions of lower quality to be declared "uncertain" or rejected.

These and other aspects of the invention are apparent from and will be elucidated with reference to the embodiments described hereinafter.

Figure 3:
Figure 4:
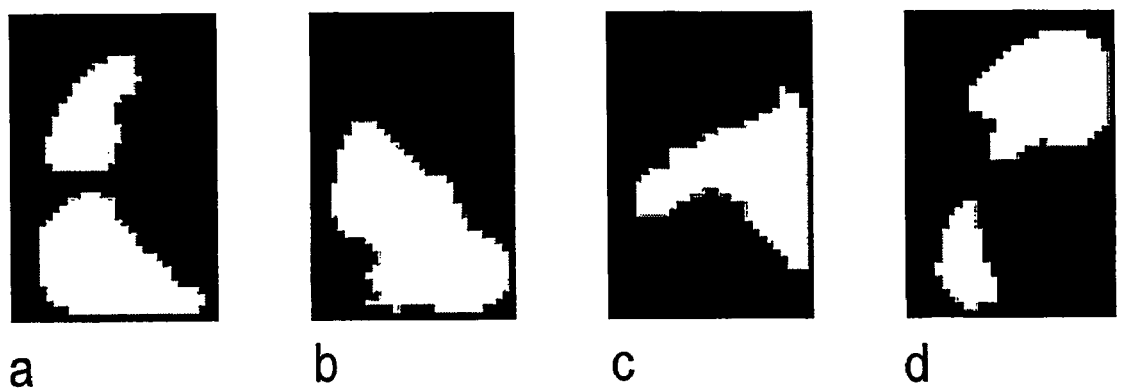
Figure 5:
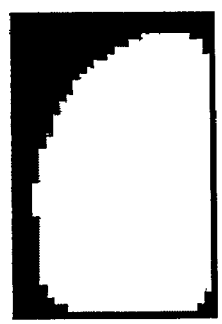

FIG. 3 also shows four surfaces after a suppression of the smallest surface fragments and sharp indentations and protrusions;

FIG. 4 shows four areas after the suppression of fairly small surface fragments, and FIG. 5 shows the bearing surface obtained after combination.

Figure 1:
FIG. 1 shows an image of a fingerprint.

The purpose of FIG. 1 is simply to show the various structures that may exist in the bearing surface 1 and the background 2 and it differs from a directly recorded image of the fingerprint in that what are shown in FIG. 1 are not shades of gray, but only black and white. What is clearly apparent in the bearing surface 1 are the structures of a fingerprint that are known per se, namely ridges and troughs (furrows). In the background there are structures parallel to an axis due to deficiencies in the sensor or in the electronic circuits.

Figure 2:
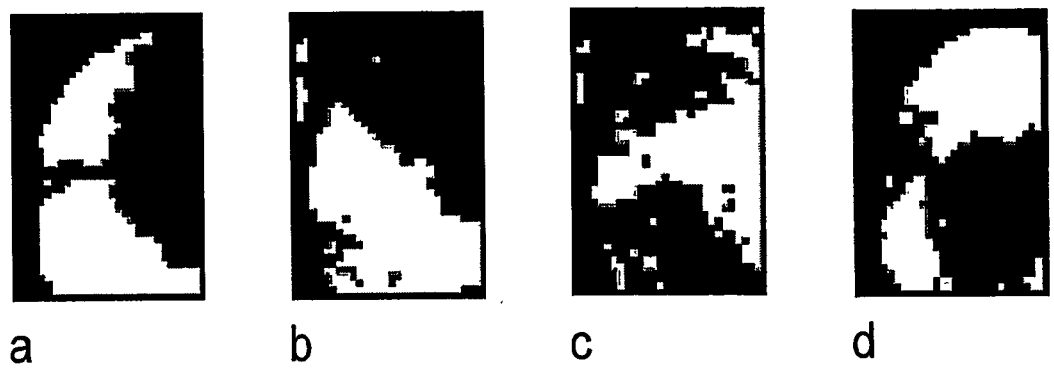
FIG. 2 shows surfaces having about the same direction of the furrows after the filtering by means of Gabor filter.

The fingerprint image shown in FIG. 1 is filtered with four Gabor filters whose cosine functions are oriented at angles of 22.5°, 67.5°, 112.5° and 157.5°. FIG. 2 shows the Gabor filters at the four different directions a to d diagrammatically. The cosine function is indicated in each case by lines that represent the maxima, while the length of the lines indicates the Gaussian bell curve.

Where there is a high correlation of the cosine function with the given ridge or furrow structure, a high variance in filter response is obtained for each region defined by a tile, whereas if the ridges extend in a direction that deviates greatly from that of the given filter or in directions that vary greatly, the variance is smaller. For this reason, the four filter responses are examined in detail as follows:

In what follows, the four individual images are examined individually. The variances of the filter responses are first calculated in each image. This is carried out in 16×16 tiles that are looked at in steps of eight pixels horizontally and vertically, which means that two adjacent tiles half overlap each other. What are obtained are four individual images that are eight times smaller in both directions and that contain the appropriate variances as values.

The variances determined in this way are compared with a threshold value. This threshold value depends on the parameters of the Gabor filters and on the characteristics of the sensor, thus has to be determined by experiment. The results of the comparison with the threshold value can be seen in FIGS. 2a to 2d.

In FIG. 2 can be seen various very small isolated areas and pointed indentations and protrusions and these are suppressed by further filtering. Provision may advantageously be made in this case for one pixel at a time to be considered to belong to a surface (i.e., in relation to the Figures, to remain or to be made white), if there are at least six white pixels in a 3×3 environment and at least fourteen in a 5×5 environment. The result of this filtering is shown in FIGS. 3a to 3d.

A search is now made in the individual images for large context components, by tracing the outlines of the individual white regions with an edge-tracing algorithm. The surface area of the regions can be determined even during the outlining by the formula $$F = \frac{1}{2}\left|\int x(t)\dot{y}(t) - x(t)\dot{x}(t)dt\right|.$$

In the formula (x(t)/y(t)) is a parameter setting for the edge. The context components whose surface area exceeds a preset value (recommended value=36) are left in place and the others are deleted. In doing this, use is made of another characteristic of fingerprints to obtain higher reliability for the bearing surface. This characteristic is the fact that, basically, there are within a fingerprint only small regions in which the direction of the furrows changes abruptly.

Everywhere else, the regions that have to be dealt with are large ones in which there is a slow, continuous change in direction. This gives the large imaged regions mentioned above in which there is high variance in the filter responses. On the other hand, small context components in which the direction is the same or similar indicate structures within the image that probably have nothing to do with the fingerprint, such as, for example, shadows or dirtying. The deletion of small context components produces the results shown in FIGS. 4a to 4d.

Combining the areas so obtained that are shown in FIGS. 4a to 4d then produces the bearing surface shown in FIG. 5. To suppress any individual pixels or peaks that may possibly still remain in the bearing surface, this is followed by filtering that takes place a number of times, preferably twice, of the kind that was described in connection with FIGS. 2 and 3.

Finally, in a further embodiment, it may also be ensured that each horizontal edge and each vertical edge intersects the bearing surface no more than once, i.e. that the bearing surface shows anisotropic convexity.

The invention claimed is:

1. A method for determining a bearing a surface in images of skin prints, the skin having ridges/furrows and the images existing in the form of image data captured by a sensor for acquiring images, characterized in that the image is filtered with a plurality of Gabor filters with different directions of the cosine function in the spatial domain, in that areas are determined from the filter responses which areas are each distinguished by an approximate direction, preset by a particular Gabor filter, of the ridges/furrows, and in that the areas are combined to an overall area corresponding to the bearing surface, characterized in that each of the areas that is distinguished by the approximate direction is determined by outlining a region of particular type pixels by means of an edge-tracing algorithm after the image is filtered with the plurality of Gabor filters, characterized in that, to allow the areas to be determined from the filter responses tile by tile into which the image is divided, a respective variance is derived from each filter response, and in that tiles having a variance that is greater than a preset threshold value are assigned to a particular area, characterized in that the derivation of the variance is performed by deriving the variances for tiles that overlap one another.

2. A method as claimed in claim 1, characterized in that four Gabor filters are used.

3. A method as claimed in claim 2, characterized in that the directions of the Gabor filters are determined by angles of 22.5°, 67.5°, 112.5°, and 157.5° to an edge of the image.

4. A method as claimed in claim 1, characterized in that, at a resolution of approximately 500 dpi, the size of the tiles used for deriving the variance is 16×16 pixels, which tiles are each processed in steps of eight pixels.

5. A method as claimed in claim 1, characterized in that the pixels are adapted by smoothing filters to the respective predominant environment of the respective pixel.

6. A method as claimed in claim 1, characterized in that the surface area of the areas determined up till then is determined and in that surfaces whose surface area is smaller than a preset size are suppressed.

7. A method as claimed in claim 1, characterized in that, on both sides of an area of interest determined up to that point, pointers that staff from either end of the side is set each to the outermost of the tiles determined as belonging to the bearing surface, the pointers then moving towards one another and, from line to line, assuming the position of a tile that is situated farther outwards or, if there is an indentation, remaining in the same position, and the travel of the pointers until they meet forms the respective edge of the definitive bearing surface.

8. A method for determining a bearing surface in images of skin prints, the skin having ridges/furrows and the images existing in the form of image data captured by a sensor for acquiring images, characterized in that the image is filtered with a plurality of Gabor filters with different directions of the cosine function in the spatial domain, in that areas are determined from the filter responses which areas are each distinguished by an approximate direction, preset by a particular Gabor filter, of the ridges/furrows, and in that the areas are combined to an overall area corresponding to the bearing surface, characterized in that, to allow the surfaces to be determined from the filter responses tile by tile into which the image is divided, a respective variance is derived from the each filter response, and in that tiles having a variance that is greater than a preset threshold value are assigned to a particular area, characterized in that the derivation of the variance is performed by deriving the variances for tiles that overlap one another.

9. A method as claimed in claim 8, characterized in that, at a resolution of approximately 500 dpi, the size of the tiles used for deriving the variance is 16×16 pixels, which tiles are each processed in steps of eight pixels.

10. A method for determining a bearing surface in images of skin prints, the skin having ridges/furrows and the images existing in the form of image data captured by a sensor for acquiring images, characterized in that the image is filtered with a plurality of Gabor filters with different directions of the cosine function in the spatial domain, in that areas are determined from the filter responses which areas are each distinguished by an approximate direction, preset by a particular Gabor filter, of the ridges/furrows, and in that the areas are combined an overall area corresponding to the bearing surface, characterized in that, on both sides of an area of interest determined up to that point, pointers that start from either end of the side is set each to the outermost of the tiles determined as belonging to the bearing surface, the pointers then moving towards one another and, from line to line, assuming the position of a tile that is situated farther outwards or, if there is an indentation, remaining in the same position, and the travel of the pointers until they meet forms the respective edge of the bearing surface.

\* \* \* \* \*